United States Patent
Lee

(10) Patent No.: US 8,469,733 B2
(45) Date of Patent: Jun. 25, 2013

(54) PLUGGABLE MODULE FOR ENGAGING WITH A CAGE MOUNTED ON A PRINTED CIRCUIT BOARD

(75) Inventor: Chun de Lee, GuangDong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 89 days.

(21) Appl. No.: 13/248,083

(22) Filed: Sep. 29, 2011

(65) Prior Publication Data

US 2013/0012052 A1 Jan. 10, 2013

(30) Foreign Application Priority Data

Jul. 7, 2011 (CN) .......................... 2011 1 0188930

(51) Int. Cl.
*H01R 13/625* (2006.01)
(52) U.S. Cl.
USPC ......................................... 439/347; 439/358
(58) Field of Classification Search
USPC .... 439/345, 347, 350, 352, 358, 372; 385/88, 385/92
See application file for complete search history.

(56) References Cited

U.S. PATENT DOCUMENTS

| | | | |
|---|---|---|---|
| 6,916,196 B2 * | 7/2005 | Long et al. | 439/352 |
| 6,935,882 B2 * | 8/2005 | Hanley et al. | 439/372 |
| 6,986,679 B1 * | 1/2006 | Aronson et al. | 439/374 |

\* cited by examiner

*Primary Examiner* — Khiem Nguyen
(74) *Attorney, Agent, or Firm* — Nixon & Vanderhye PC

(57) ABSTRACT

A pluggable module includes a base, a cover assembled with the base to form a housing and a latching mechanism at least partially disposed within the housing. The latching mechanism includes an actuating portion and a single sliding portion which is connected with the actuating portion and disposed within the housing, the single sliding portion including a flat board and two sliding legs respectively extending from two opposite sides of the flat board, each sliding leg having a latching protrusion formed thereon and exposed outside the housing for latching with and detaching from the cage. The present invention uses a single sliding portion to replace two sliding arms thereby simplifying the manufacturing and assembling process, in turn, reducing the manufacturing and assembling cost.

14 Claims, 6 Drawing Sheets

PLUGGABLE MODULE FOR ENGAGING WITH A CAGE MOUNTED ON A PRINTED CIRCUIT BOARD

This application claims the benefit of Chinese Patent Application No. 201110188930.0, filed on Jul. 7, 2011, the entire content of which is hereby incorporated by reference in this application.

FIELD OF THE INVENTION

The present invention relates to electronic connector devices and, more particularly, to a pluggable module with an improved latching mechanism adapted for engaging with a cage mounted on a printed circuit board for high-speed transmission.

BACKGROUND OF THE INVENTION

Computers and related peripheral equipment, and communication systems, have in the recent past evolved extremely rapidly. These systems require ever increasing data transfer rates to perform the highly complex tasks that is drive the systems, such as digital signal processing, image analysis, and communications. With current demands, optical couplers are used to transfer signals over short and long distances between computers, between two circuit boards in one computer, and even between multiple chips on a single printed circuit board. The use of high speed optical signals in place of electrical interconnections increases the achievable data transfer rate.

In the art today, communication host system like switch or router equipments are usually designed with pluggable interface, for instance, SFP (Small Form-factor Pluggable), XSFP and QSFP are all modules for fiber optic transmission or ordinary signal transmission. All of the modules are of small size or form factor which is important. The smaller the form factor of the module, the less space taken on a printed circuit board to which it couples. A smaller form factor allows a greater number of modules to be coupled onto a printed circuit board to support additional communication channels. Based on industrial standard, cages and sockets on host system are used for accommodating and connecting with standard compliant modules. A connector or module is plugged into the cage and electrical connection established with socket on host. Link between equipments could be setup for communication. Robust and reliable connection is the prerequisite to make the communication system stable. Thus, a latching mechanism is required to keep the connector or module stable within the cage.

As shown in FIG. 1a and FIG. 1b, a conventional pluggable module 100, adapted for engaging with a corresponding cage or module receptacle mounted on a printed circuit board (not shown), generally includes a base 110, a cover 120 and a latching mechanism 130 which has a pair of sliding arms 131 with latching ends 131a and a crosspiece 132 connecting the two sliding arms 131. The base 110 includes two sidewalls 111, each of which has a sliding track 111a formed thereon for receiving the sliding arm 131 of the latching mechanism 130. When pushing or pulling the crosspiece 132, the sliding arms 131 connected to the crosspiece 132 will be actuated to slide along with the tracks 111a and its latching ends 131a will engage with or separate from tabs of the cage (not shown), thereby realizing the latching or releasing for the whole pluggable module 100.

However, the design of above conventional pluggable module results in some drawbacks as follows. Firstly, the two sliding arms of the latching mechanism are required to match with the two tracks of the housing (composed of the base and the cover), thus more complexity process is required for assembly. Secondly, for well latch or de-latch operation, the dimension and tolerance of sliding arms need to meet tight criteria for production and good yield which will increase manufacturing cost. Finally, there is trade-off in sliding arm's thickness design consideration. For rigid concern, sliding arms always need to be thicker, but this will cause the sidewalls of housing to be thick too, finally the PCB area inside the housing will decrease. In the contrast, thinner sliding arms could have wider PCB area, however, quality of parts will be not good for control and tracks on the housing to accommodate sliding arms also not easy to manufacture by simple die-casting process.

Accordingly, it is desired to provide a pluggable module with an improved latching mechanism to overcome the above-mentioned drawbacks.

SUMMARY OF THE INVENTION

One objective of the present invention is to provide a pluggable module having a simpler structure, thereby simplifying the manufacturing and assembling process thereof and then reducing the manufacturing and assembling cost.

Another objective of the present invention is to provide a pluggable module having wider PCB area, thereby improving the performance of pluggable module.

To achieve above objectives, the present invention provides a pluggable module adapted for engaging with a cage mounted on a printed circuit board, the pluggable module includes a base, a cover assembled with the base to form a housing and a latching mechanism at least partially disposed within the housing. The latching mechanism includes an actuating portion and a single sliding portion which is connected with the actuating portion and disposed within the housing, the single sliding portion including a flat board and two sliding legs respectively extending from two opposite sides of the flat board, each sliding leg having a latching protrusion formed thereon and exposed outside the housing for latching with and detaching from the cage.

As an embodiment of the present invention, both of the two sliding legs are almost perpendicular to the flat board.

Preferably, the latching protrusions are wedge-shaped.

Preferably, the single sliding portion is integrated with the actuating portion to form a one-piece structure thereby simplifying the die-casting process.

Preferably, the flat board has two opposite edges almost perpendicularly bent to form two side flanges respectively thereby increasing the rigidity of the latching mechanism.

Preferably, each side flange has a front end adjacent to the actuating portion and a tail end away from the actuating portion, the sliding leg extending from side of the tail end of the flange.

Preferably, the housing has two sidewalls, each of which has a side cutout formed thereon for receiving the latching protrusion.

Preferably, the sidewall is composed of a first sidewall formed on the base and a second sidewall formed on the cover, and the side cutout is composed of a first cutout formed on the first sidewall and a second cutout formed on the second sidewall.

Preferably, the base further has two receiving slots adjacent to the side cutouts for receiving the two sliding legs respectively, each receiving slot being composed of the first sidewall and a holding wall formed on the bottom of the base.

Preferably, the base has a first rear wall which defines a cambered first exiting opening for the existence of a cable and a pair of rear cutouts formed on the two corners thereof, and the cover has a second rear wall which defines a rectangular second exiting opening and a pair of pillars for being assembled to the rear cutouts respectively.

Preferably, the pluggable module further comprises a handle assembled to the actuating portion of the latching mechanism for selectively being pulled to separate the pluggable module from the cage.

Preferably, the handle has a connecting end, an operating end and a neck connecting the connecting end and operating end.

Preferably, the connecting end has a plurality of fasteners formed thereon for being assembled with a plurality of mounting holes formed on the actuating portion.

Preferably, the operating end has a plurality of strips formed on two opposite surfaces thereof for increasing friction.

In comparison with the prior art, the pluggable module of the present invention includes a single sliding portion to replace two sliding arms, the sliding portion is located within the housing instead of sides of the housing, thus, the housing of the present invention can dispense with two tracks. By this token, the pluggable module of the present invention has a simpler structure thereby simplifying the manufacturing and assembling process and then reducing the manufacturing and assembling cost. Furthermore, due to the single sliding portion design, the pluggable module of the present invention can achieve a wider PCB area inside the housing for application than a conventional one with slider pair while keep the structure of the pluggable module rigid, thereby the performance of the present pluggable module also can be improved.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is an exploded perspective view of the conventional pluggable module shown in FIG. 1a;

DETAILED DESCRIPTION OF ILLUSTRATED EMBODIMENTS

Figure 1A:
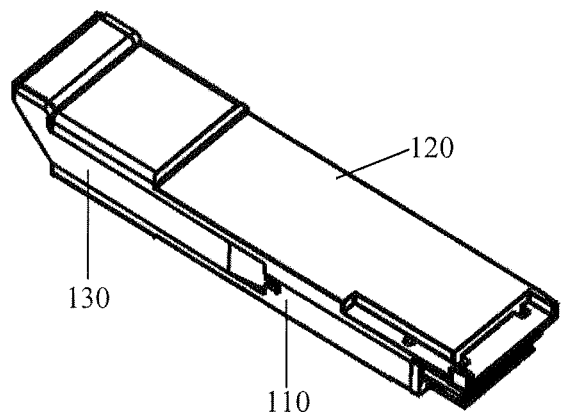
FIG. 1a is a perspective view of a conventional pluggable module.
Figure 1B:
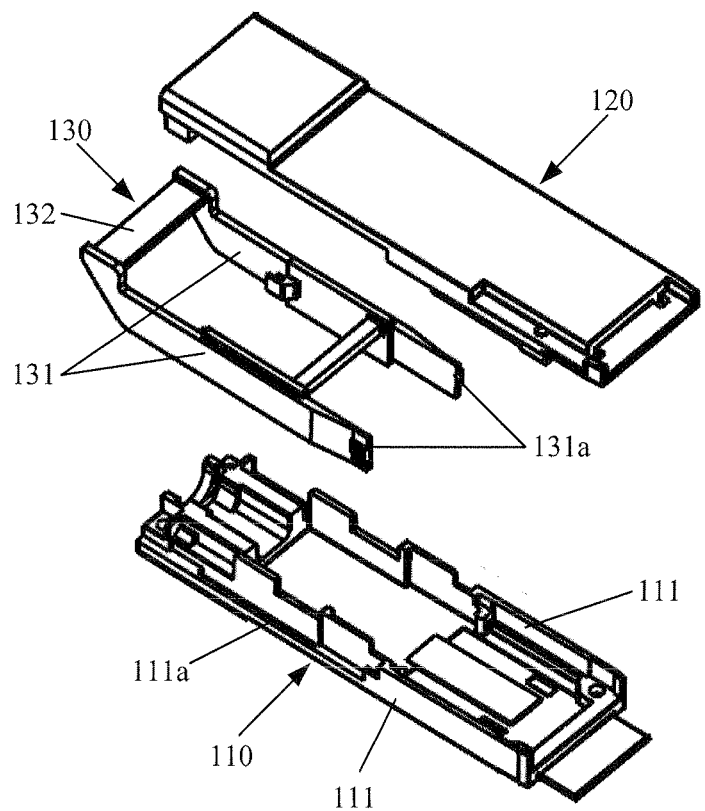

As indicated above, the invention is directed to a pluggable module adapted for engaging with a cage mounted on a printed circuit board, the pluggable module includes a base, a cover assembled with the base to form a housing and a latching mechanism at least partially disposed within the housing. The latching mechanism includes an actuating portion and a single sliding portion which is connected with the actuating portion and disposed within the housing, the single sliding portion including a flat board and two sliding legs respectively extending from two opposite sides of the flat board, each sliding leg having a latching protrusion formed thereon and exposed outside the housing for latching with and detaching from the cage. Based on above design, the pluggable module of the present invention has a simpler structure thereby simplifying the manufacturing and assembling process thereof and then reducing the manufacturing and assembling cost. Additionally, the pluggable module further has a wider PCB area thereby improving the performance of pluggable module. Now, a preferred embodiment of the invention will be described as follows with reference to the figures, wherein like reference numerals designate similar parts throughout the various views.

Figure 2:
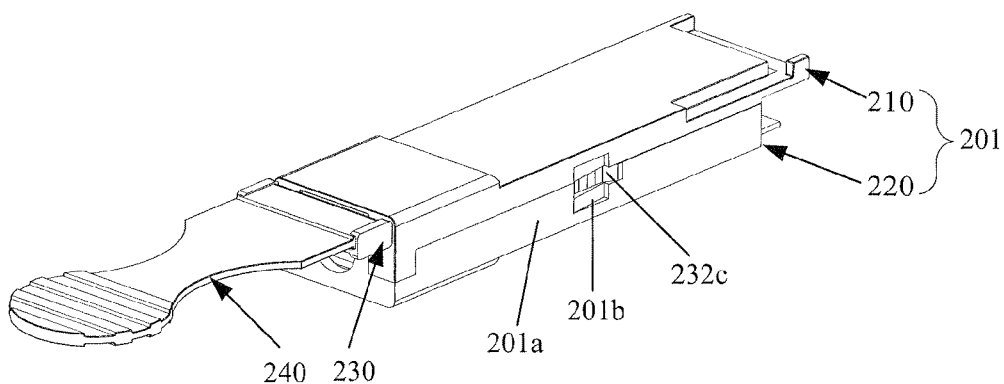
FIG. 2 is a perspective view of a pluggable module according to an embodiment of the present invention.

FIG. 2 is a perspective view of a pluggable module according to an embodiment of the present invention. Now referring to FIG. 2, the pluggable module 200 of the present invention includes a housing 201 composed of a base 210 and a cover 220, a latching mechanism 230 partially disposed within the housing 201 and a handle 240 connected to the latching mechanism 230 for controlling the movement of the latching mechanism 230. The housing 201 has two opposite sidewalls 201a, each sidewall 201a has a side cutout 201b formed thereon for receiving a latching protrusion 232c which is formed on the latching mechanism 230 for engaging with and disengaging from a cage (not shown) mounted on a printed circuit board (not shown).

Now, referring to FIG. 3 to FIG. 6, the detailed structure of the pluggable module 200 will be described as follows.

Figure 3:
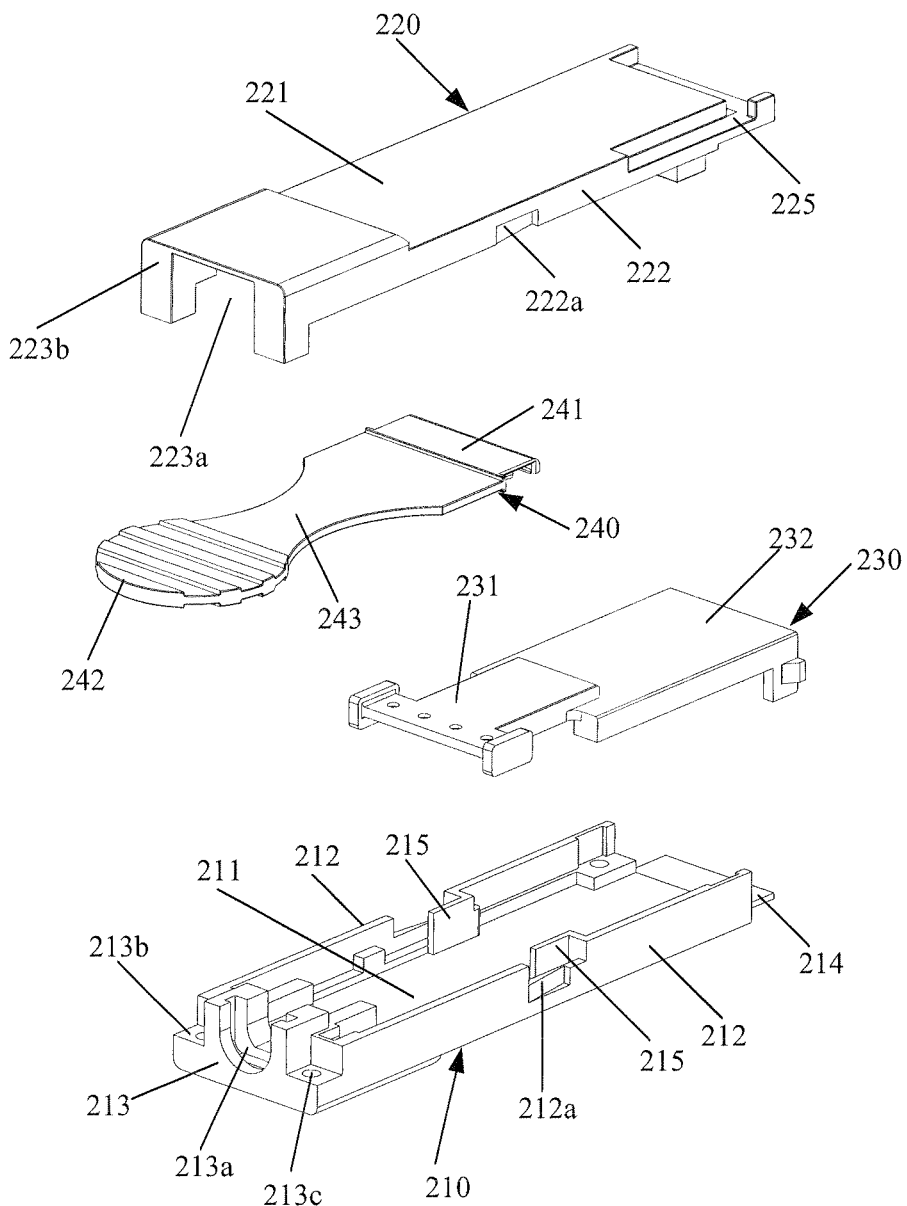
FIG. 3 is an exploded perspective view of the pluggable module shown in FIG. 2.
Figure 4:
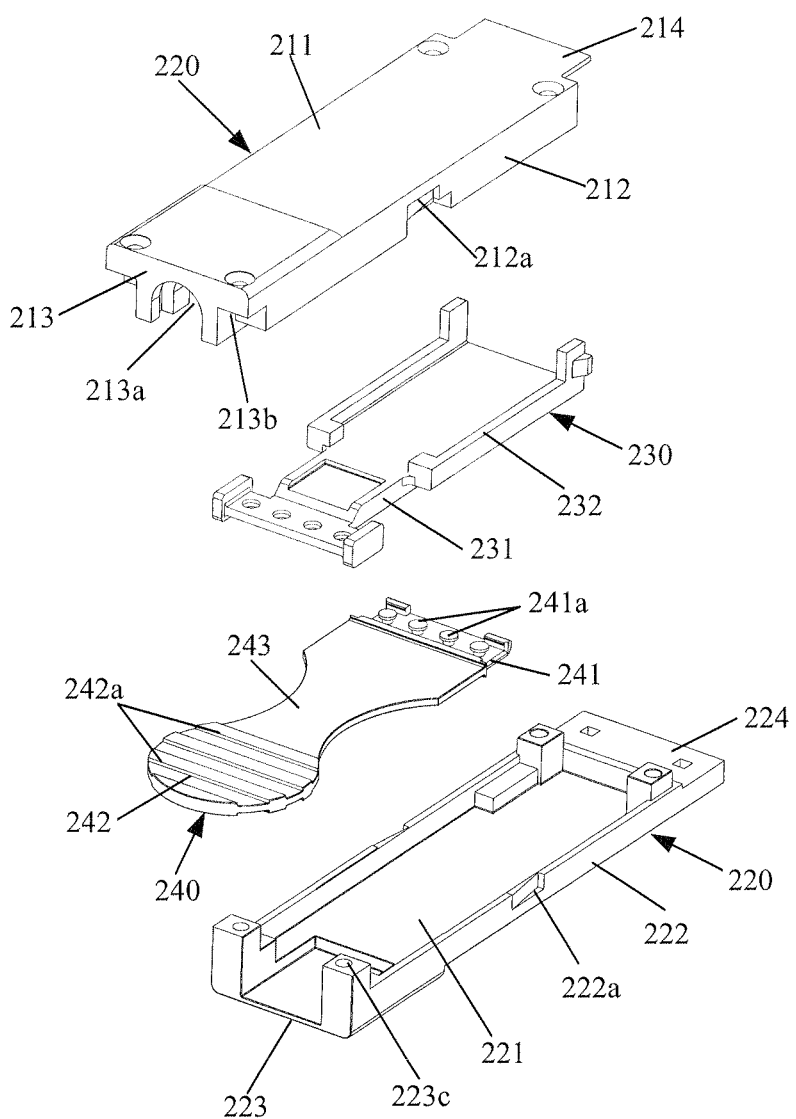
FIG. 4 is another exploded perspective view of the pluggable module shown in FIG. 2.

As shown in FIG. 3 and FIG. 4, the base 210 is elongated and includes a step-shape bottom board 211, a pair of first sidewalls 212 and a first rear wall 213 upwardly extending from the bottom board 211. Further, the bottom board 211 extends forwardly beyond the front end thereof to form a first front flange 214.

The first rear wall 213 defines a cambered first exiting opening 213a for the existence of a cable (not shown), a pair of rear cutouts 213b formed on the two corners thereof and a pair of first mounting holes 213c respectively formed on the two rear cutouts 213b. The outer part of each first sidewall 212 is partially cut to leave thinner and lower inner part thereby forming a first cutout 212a in the middle of the first sidewall 212. Adjacent to the first cutouts 212a, there further has a L-shape holding wall 215 extending from the bottom board 211 and connected to the first sidewall 212 by one end thereby a receiving slot (not shown) is formed between the holding wall 215 and the thinner inner part of the first sidewall 212.

The cover 220 is also elongated and includes a step-shape top board 221, a pair of second sidewalls 222 and a second rear wall 223 extending downwardly from the top board 221. Further, the top board 221 extends forwardly beyond the front end thereof to form a second front flange 224 parallel spaced from the first front flange 214. An L-shape cutout 225 is recessed downwardly from upper surface of the top board 221 and occupies one corner of the top board 221 for preventing excessive insertion of the pluggable module 200. The second rear wall 223 defines a rectangular second exiting opening 223a, a pair of pillars 223b and a pair of second mounting holes 223c respectively formed on the two pillars 223b. The outer part of each second sidewall 222 is partially cut to leave thinner inner part thereby forming a second cutout 222a in the middle of the second sidewall 222. The location where the second cutout 222a formed is corresponding to that of the first cutout 212a, thus, when the cover 220 assembled to the base 210, the first cutout 212a and the second cutout 222a are assembled to compose the side cutout 201b of the housing 201.

In this embodiment, the handle 240 is made of a thin plate for selectively being pulled to separate the pluggable module from the cage and being pushed to latch the pluggable module in the cage. As shown in FIG. 3 and FIG. 4, the handle 240 has a connecting end 241 adapted for connecting with the latching mechanism 230, an operating end 242 adapted for a user to operate and a neck 243 adapted for connecting the connecting end 241 and the operating end 242. Concretely, the connecting end 241 of the thin plate 240 has a plurality of fasteners 241a formed thereon for being assembled with a plurality mounting holes 231c formed on the latching mechanism 230. The operating end 242 has a plurality of strips 242a formed on both of two surfaces thereof for increasing friction which is of benefit to the operation of a user. All of the strips 242a are parallel to each other.

Figure 5:
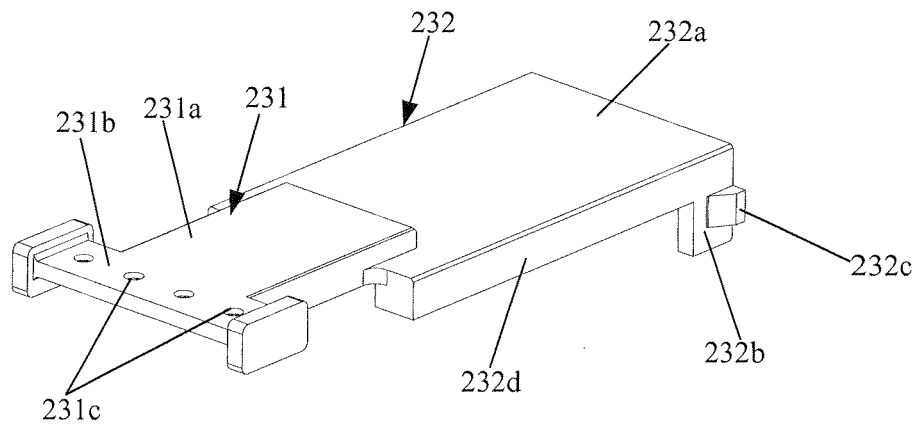
FIG. 5 is a perspective view of a single sliding portion of the pluggable module shown in FIG. 2.
Figure 6:
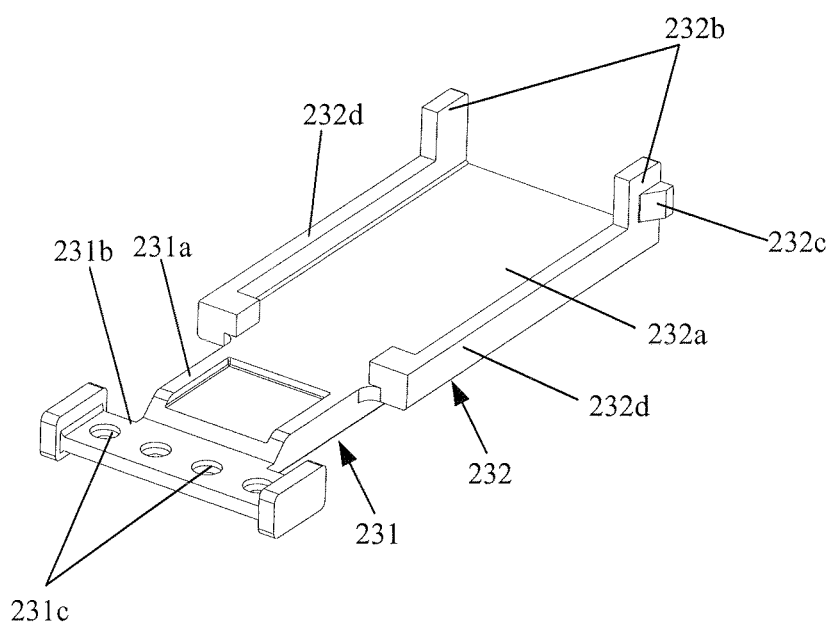
FIG. 6 is another perspective view of the single sliding portion shown in FIG. 5.
Figure 7:
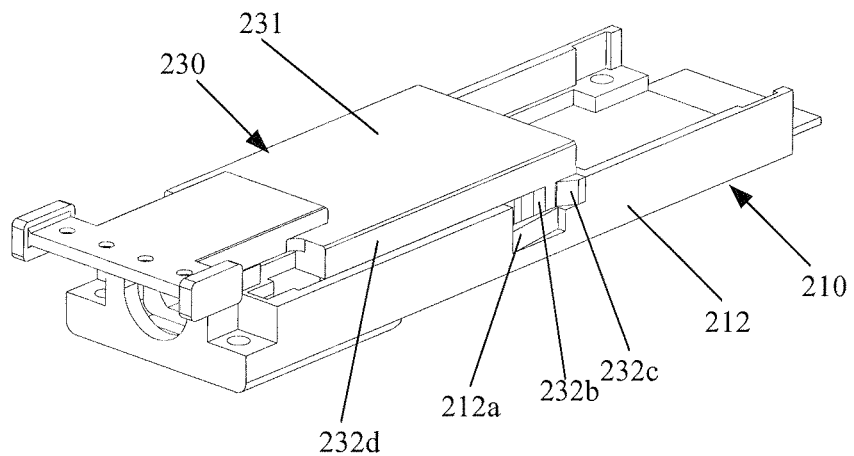
FIG. 7 is a schematic diagram showing a latching position of the pluggable module shown in FIG. 2.
Figure 8:
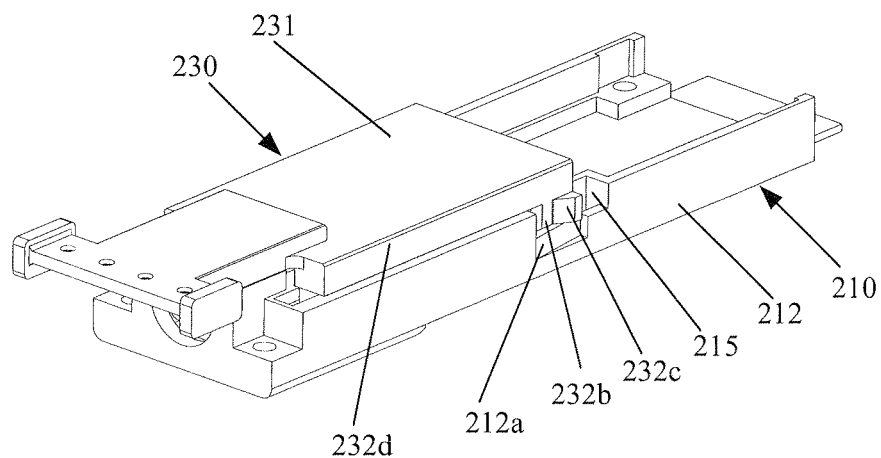
FIG. 8 is a schematic diagram showing a releasing position of the pluggable module shown in FIG. 2.

Referring to FIG. 5 and FIG. 6, the latching mechanism 230 includes an actuating portion 231 and a single sliding portion 232, in this embodiment, the single sliding portion 232 is integrated with the actuating portion 231 to form a one-piece structure, that is, the whole mechanism 230 is one-piece thereby simplifying the die-casting process. As shown in FIG. 5 and FIG. 6, the actuating portion 231 has a main part 231a connecting to the single sliding portion 232 and an extended part 231b on which the mounting holes 231c are formed for assembled with the handle 240. The single sliding portion 232 includes a flat board 232a and two sliding legs 232b respectively extending from two opposite sides of the flat board 232a. In this preferred embodiment, the flat board 232a is almost parallel to the bottom board 211 and top board 221, and two opposite edges of the flat board 232a are almost perpendicularly bent to form two side flanges 232d, respectively, which are provided to increase the rigidity of the single sliding portion 232. Each side flange 232d has a front end adjacent to the actuating portion 231 and a tail end away from the actuating portion 231. In this embodiment, each sliding leg 232b extends from side of the tail end of each side flange 232d and parallels the side flange 232d, that is, the sliding leg 232b is almost perpendicular to the flat board 232a. Each sliding leg 232b having a wedge-shape latching protrusion 232c formed thereon for latching with and detaching from the cage.

In assembly, referring to FIG. 2 to FIG. 8, the latching mechanism 230 is firstly assembled to the base 210 with the actuating portion 231 supported by the first rear wall 213 of the base 210, and the sliding legs 232b respectively received in the receiving slots and supported by the bottom board 211. Then the cover 220 is assembled to the base 210 with the pillars 223b respectively engaging with the rear cutouts 213b of the base 210, and the second sidewalls 222 supported by the first sidewalls 212. Finally, the handle 240 is assembled to the latching mechanism 230 by aligning the fasteners 241a with the mounting holes 231c. After such an assembly, the pluggable module 200 is achieved. As shown in FIG. 2, the latching mechanism 230 is sandwiched between the base 210 and the cover 220, and disposed within the housing 201 besides the extended part 231b of the actuating portion 231 extending from the rear of the housing 201 for connecting with the handle 240 and the latching protrusions 232c of the sliding legs 232b exposed outside the housing 201 and received in the side cutouts 201b of the housing 201 for latching. It should be noted that the assembly process of the present pluggable module 200 is not limited to above order, for example, the latching mechanism 230 also can be assembled with the handle 240 before assembled in the housing 201.

Based on above structure, when removing the pluggable module 200 from the cage or other module receptacle, operator may grasp the operating end 242 of the handle 240 and exerts a rearward force to the handle 240, thereby the latching mechanism 230 is pulled rearward. With the rearward movement of the latching mechanism 230, the sliding legs 232b will slide along with the receiving slot formed on the base 210 and the latching protrusions 232c of the latching mechanism 230 will move from a latching position shown in FIG. 7 to a releasing position shown in FIG. 8, thereby disengaging the pluggable module from the cage.

As described above, the pluggable module 200 of the present invention includes a single sliding portion 230 to replace two sliding arms 131, and the sliding portion 230 is located within the housing 201 instead of sides of the housing, thus, the housing 201 of the present invention can dispense with two tracks. By this token, the pluggable module 200 of the present invention has a simpler structure thereby simplifying the manufacturing and assembling process and then reducing the manufacturing and assembling cost. Furthermore, due to the single sliding portion design, the pluggable module 200 of the present invention can achieve a wider PCB area inside the housing for application than a conventional one with slider pair while keep the structure of the pluggable module rigid, thereby the performance of the present pluggable module also can be improved.

Because the other structure and/or assembly process of pluggable module of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A pluggable module adapted for engaging with a cage mounted on a printed circuit board, comprising:
   a base;
   a cover assembled with the base to form a housing; and
   a latching mechanism at least partially disposed within the housing;
   wherein the latching mechanism comprises an actuating portion and a single sliding portion which is connected with the actuating portion and disposed within the housing, the single sliding portion comprising a flat board and two sliding legs respectively extending from two opposite sides of the flat board, each sliding leg having a latching protrusion formed thereon and exposed outside the housing for latching with and detaching from the cage.

2. The pluggable module as claimed in claim 1, wherein both of the two sliding legs are almost perpendicular to the flat board.

3. The pluggable module as claimed in claim 1, wherein the latching protrusions are wedge-shaped.

4. The pluggable module as claimed in claim 1, wherein the single sliding portion is integrated with the actuating portion to form a one-piece structure.

5. The pluggable module as claimed in claim 1, wherein the flat board has two opposite edges almost perpendicularly bent to form two side flanges respectively.

6. The pluggable module as claimed in claim 5, wherein each side flange has a front end adjacent to the actuating portion and a tail end away from the actuating portion, the sliding leg extending from side of the tail end of the side flange.

7. The pluggable module as claimed in claim 1, wherein the housing has two sidewalls, each of which has a side cutout formed thereon for receiving the latching protrusion.

8. The pluggable module as claimed in claim 7, wherein the sidewall is composed of a first sidewall formed on the base and a second sidewall formed on the cover, and the side cutout is composed of a first cutout formed on the first sidewall and a second cutout formed on the second sidewall.

9. The pluggable module as claimed in claim 8, wherein the base further has two receiving slots adjacent to the side cutouts for receiving the two sliding legs respectively, each receiving slot being composed of the first sidewall and a holding wall formed on the bottom of the base.

10. The pluggable module as claimed in claim 1, wherein the base has a first rear wall which defines a cambered first exiting opening for the existence of a cable and a pair of rear cutouts formed on the two corners thereof, and the cover has a second rear wall which defines a rectangular second exiting opening and a pair of pillars for being assembled to the rear cutouts respectively.

11. The pluggable module as claimed in claim 1, wherein further comprises a handle assembled to the actuating portion of the latching mechanism for selectively being pulled to separate the pluggable module from the cage.

12. The pluggable module as claimed in claim 11, wherein the handle has a connecting end, an operating end and a neck connecting the connecting end and operating end.

13. The pluggable module as claimed in claim 12, wherein the connecting end has a plurality of fasteners formed thereon for being assembled with a plurality of mounting holes formed on the actuating portion.

14. The pluggable module as claimed in claim 12, wherein the operating end has a plurality of strips formed on two opposite surfaces thereof for increasing friction.

\* \* \* \* \*